United States Patent [19]

Yamamoto et al.

[11] Patent Number: 5,657,112

[45] Date of Patent: Aug. 12, 1997

[54] PHOTOGRAPHIC EXPOSURE APPARATUS

[75] Inventors: Masahiro Yamamoto; Hiroshi Oku, both of Wakayama, Japan

[73] Assignee: Noritsu Koki Co., Ltd., Wakayama, Japan

[21] Appl. No.: 600,862

[22] Filed: Feb. 9, 1996

[30] Foreign Application Priority Data

| Feb. 21, 1995 | [JP] | Japan | 7-032591 |
| Oct. 25, 1995 | [JP] | Japan | 7-278103 |
| Dec. 11, 1995 | [JP] | Japan | 7-321797 |

[51] Int. Cl.⁶ .................................................. G03B 27/70
[52] U.S. Cl. ........................................... 355/43; 355/66
[58] Field of Search ............................... 355/43, 46, 66

[56] References Cited

U.S. PATENT DOCUMENTS

| 4,299,480 | 11/1981 | Gilkeson et al. | 355/66 |
| 4,764,807 | 8/1988 | Kimura et al. | 355/43 X |
| 4,786,944 | 11/1988 | Sakamoto et al. | 355/43 X |

*Primary Examiner*—Arthur T. Grimley
*Assistant Examiner*—David A. Lane
*Attorney, Agent, or Firm*—Wenderoth, Lind & Ponack

[57] ABSTRACT

A photographic exposure apparatus has a light path for directing an optical pattern of a display image from an image display to a photosensitive material and a light path for directing an optical pattern of a negative image from a negative film of the photosensitive material. The two light paths are selectively switched from one to the other to project each of the display and negative images onto the photosensitive material at a common exposure station. A mirror is disposed turnably to be movable across and between the two light paths. A mirror drive turns the mirror through a predetermined angle to switch between the light path for projecting the display image and the light path for projecting the negative image.

12 Claims, 15 Drawing Sheets

PHOTOGRAPHIC EXPOSURE APPARATUS

BACKGROUND OF THE INVENTION

The present invention relates to an improvement of a photographic exposure apparatus for recording on a photosensitive material image data from an image projecting means as well as image data from a negative film.

As shown in FIG. 15, a conventional photographic exposure apparatus comprises a negative image exposure means 31 and a CRT image exposure means 32 arranged in a row and provided with respective exposure stations 33 and 34. For an exposure operation, a sheet of printing paper P is advanced to the exposure station 33 where it is exposed to an image emitted through a negative film and then to the exposure station 34 where it is exposed to a CRT image data projected from the CRT means 32. It is however a disadvantage of such conventional apparatus that overall dimensions thereof are large since exposure station 34 for the CRT image exposure means 32 requires a considerable amount of space.

A modification of such photographic exposure apparatus is shown in FIG. 16, in which a mirror 43 is used for moving to and from the path of exposure light to switch between a negative image exposure means 41 and a CRT image data exposure means 42. Such modification still requires considerable space for forward and backward movements of the mirror 43, thus failing to minimize overall dimensions of the apparatus. Also, the backward movement of the mirror 43 from the light path takes an extra length of time and thus retards the switching operation across the light path. For such backward movement, the mirror 43 is turned about a pivotal support 43A. This operation causes the mirror 43 to move with poor stability and to produce vibrations during the printing process. In addition, movement of a lens unit and a CRT is controlled for varying the length of the light path to have a desired print size of the CRT image, adding another structural difficulty to the apparatus. It is possible to replace the movement of the lens unit with the exchange of different lens units which is a difficult task for an operator. Furthermore, as the printing of a CRT image requires a sizable portion of the time of the printing process, it largely affects the operational efficiency of the apparatus.

It is an object of the present invention, in view of the foregoing disadvantages, to provide a photographic exposure apparatus capable of switching the light path rapidly, while forward and backward movements of a mirror are eliminated, thus saving space.

It is another object of the present invention to provide a photographic exposure apparatus in which a mirror is securely held, thus minimizing vibration during printing, and an exposure lens may be exchanged with another simply and readily.

It is a further object of the present invention to provide a photographic exposure apparatus having a lens switching means of simple construction.

It is a still further object of the present invention to provide a photographic exposure apparatus that includes a lens switching means, without increasing the overall dimensions of the apparatus.

It is a still further object of the present invention to provide a photographic exposure apparatus capable of printing an image projected from an image display means during a cycle of a period of printing a negative film image.

SUMMARY OF THE INVENTION

According to the invention, a photographic exposure apparatus has a light path for directing an optical pattern of a display image from an image display means to a photosensitive material and a light path for directing an optical pattern of a negative image from a negative film to the photosensitive material. Such two light paths are selectively switched from one to the other to project each of the display and negative images onto the photosensitive material at a common exposure station. A mirror is disposed turnably across and between the two light paths. A mirror drive turns the mirror through a predetermined angle to switch between the light path for projecting the display image and the light path for projecting the negative image.

Further according to the invention, a photographic exposure apparatus allows an exchange of an exposure lens disposed across a light path for directing an optical pattern of an image to a photosensitive material. A turret table has a plurality of different exposure lenses placed in an order thereon. A desired one of the different exposure lenses is positioned across the light path by turning the turret table to a corresponding location.

Accordingly to the invention, the mirror may be mounted pivotably on a pivot shaft. A light path switching means may be joined to an end region of the mirror spaced from the pivot shaft for turning the mirror about the pivot shaft to switch between the light path for projecting the display image and the light path for projecting the negative image. Further according to the invention, there may be a light path switching means for switching to the light path for projecting the display image by actuating a mirror, and lens switching means for selecting and positioning across the light path for projecting the display image one of plural exposure lenses which are placed on a lens holder by moving the lens holder. The lens switching means is disposed in a light path switching station where the light switching means is installed.

A controller allows the photosensitive material to be exposed to the display image from the image display means during a period from the end of printing one negative image to the start of printing another negative image.

DETAILED DESCRIPTION OF THE PREFERRED EMBODIMENTS

EMBODIMENT 1

Figure 1:
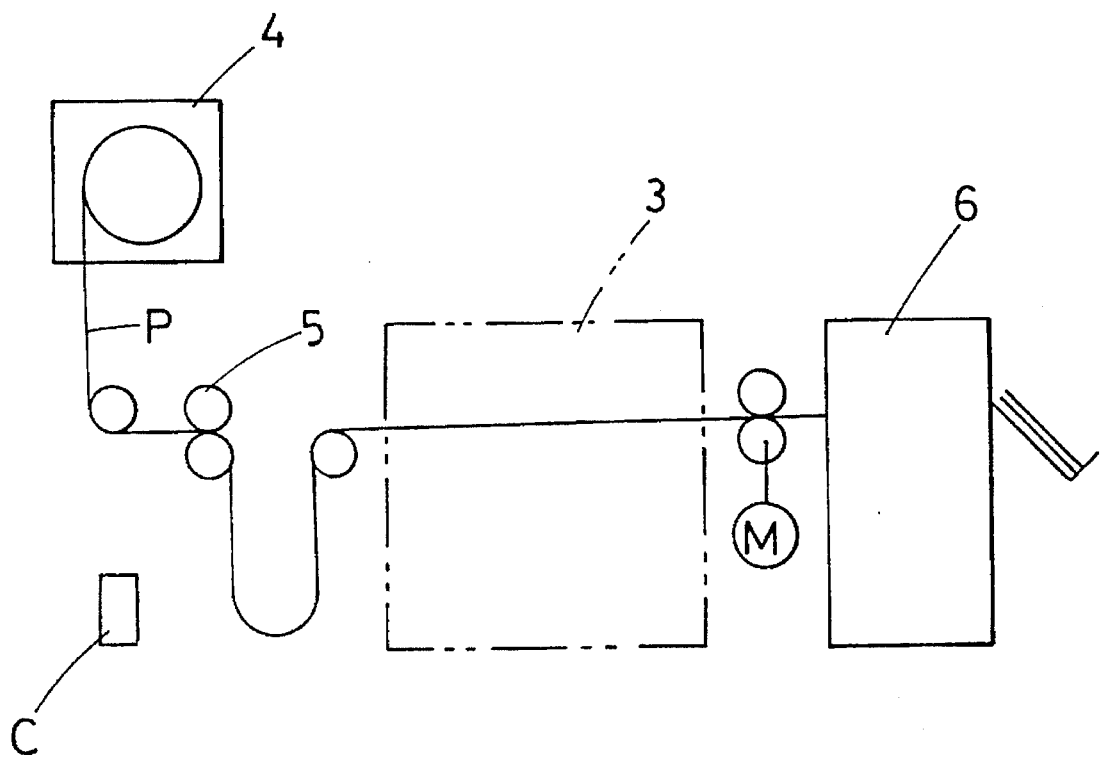
FIG. 1 is a schematic view of a photographic exposure apparatus showing Embodiment 1 of the present invention.
Figure 2:
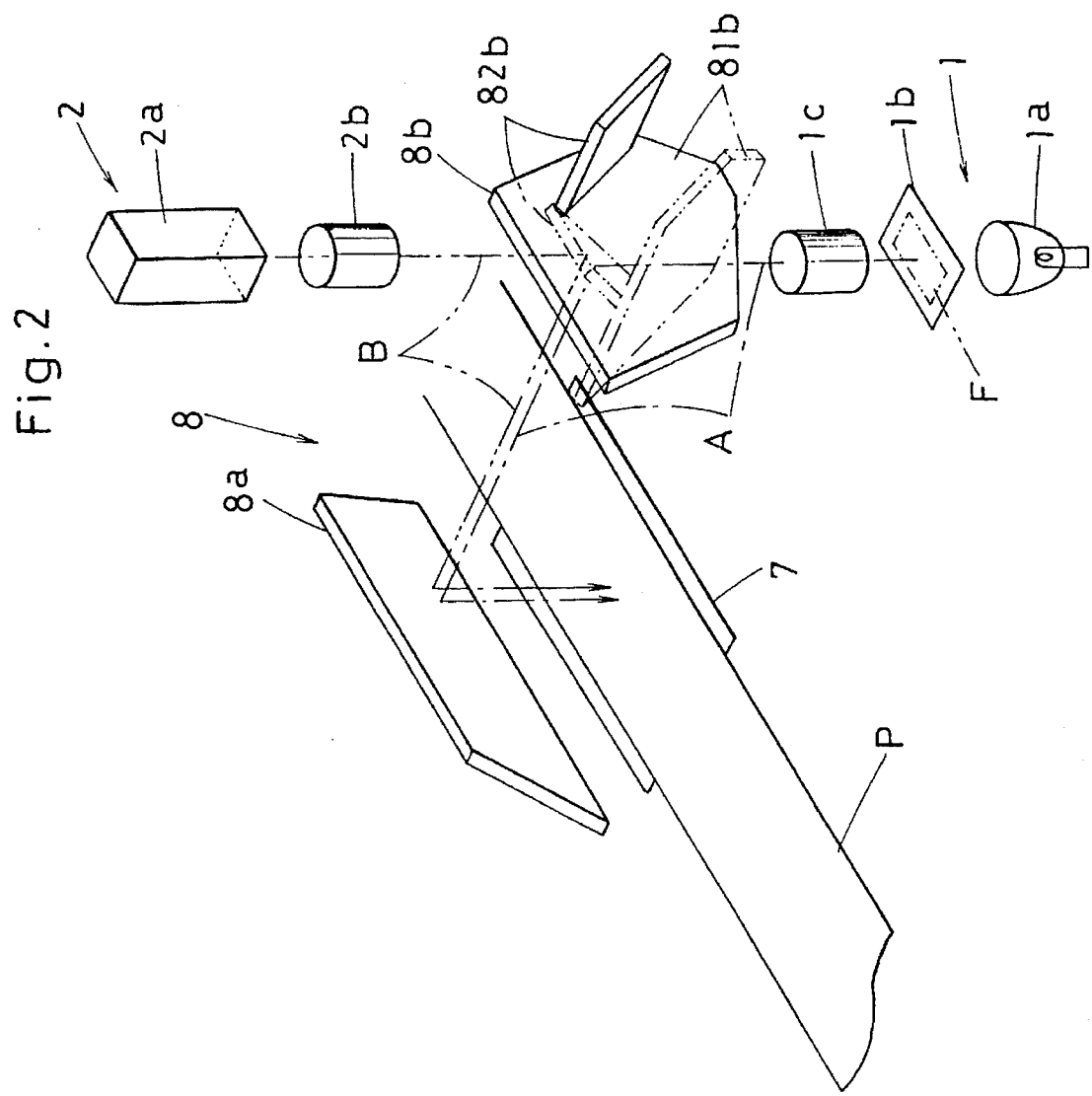
FIG. 2 is a perspective view of the same.

A photographic exposure apparatus of Embodiment 1 according to the present invention is shown in FIGS. 1 to 4.

The photographic exposure apparatus includes an exposure module 3 which comprises a negative image exposure means or device 1 and an image display device in the form of a CRT image exposure means or device 2. A sheet of printing paper P is unloaded from a magazine 4 and conveyed by transfer rollers 5 to the exposure module 3 where it is exposed to a negative film image and a CRT image. Denoted by C is a controller for the photographic exposure apparatus. The printing paper P is then transferred to a development module 6 where it is subjected to a development process and cut into pieces of a desired size before being discharged.

The negative image exposure means 1 is designed for directing an intensity of light from a light source 1a to a negative film F and projecting a negative image of the film F onto the printing paper P at an exposure station 7.

The CRT image exposure means 2 is provided with a CRT display (not shown) for projecting and printing onto the printing paper P a CRT image which is provided in the form of index data or text data and displayed on a CRT 2a. For printing the index data on the printing paper P, each frame image is read by a reader (not shown) from the negative film F and its corresponding information is transmitted to the controller C where it is converted into an index data form. The index data is projected from the CRT 2a through an exposure lens 2b onto a predetermined region of the printing paper P. A resultant index print carries a reduced size of the frame image of the negative F showing an index data. For printing the text data on the printing paper P, a desired form of the text data, e.g. shooting date, location, and caption entered through a keyboard, or of computer graphics created with a personal computer is displayed on the CRT 2a and projected through the exposure lens 2b onto the printing paper P for recording. The text data may be overlapped with the negative image previously printed or printed on exclusive sheet of the printing paper P.

There is provided a mirror device 8 for switching between a light path A extending from the negative image exposure means 1 and a light path B extending from the CRT image exposure means 2. The mirror device 8 comprises a stationary mirror 8a and a movable mirror assembly 8b arranged opposite to each other at a right angle to the direction of conveying the printing paper P. The reflective surface of the stationary mirror 8a is tilted 45 degrees from s vertical line which extends at a right angle to the upper surface of the printing paper P in the exposure station 7. The movable mirror assembly 8b consists of a first mirror 81b and a second mirror 82b of which reflective surfaces are also arranged at an angle of 45 degrees to the vertical line from the printing paper P.

Figure 3:
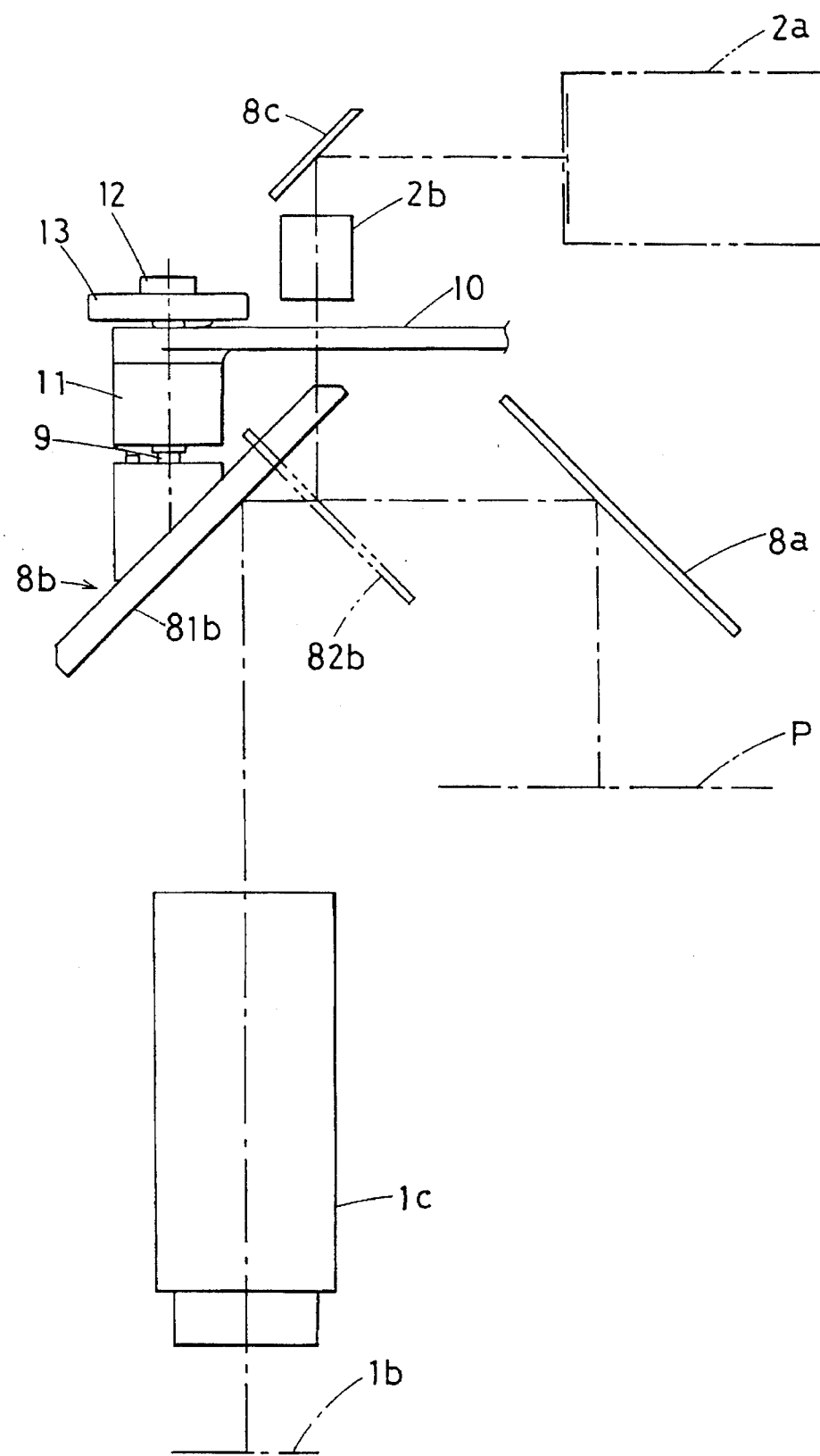
FIGS. 3 and 4 are front views showing a primary part of the same.
Figure 4:
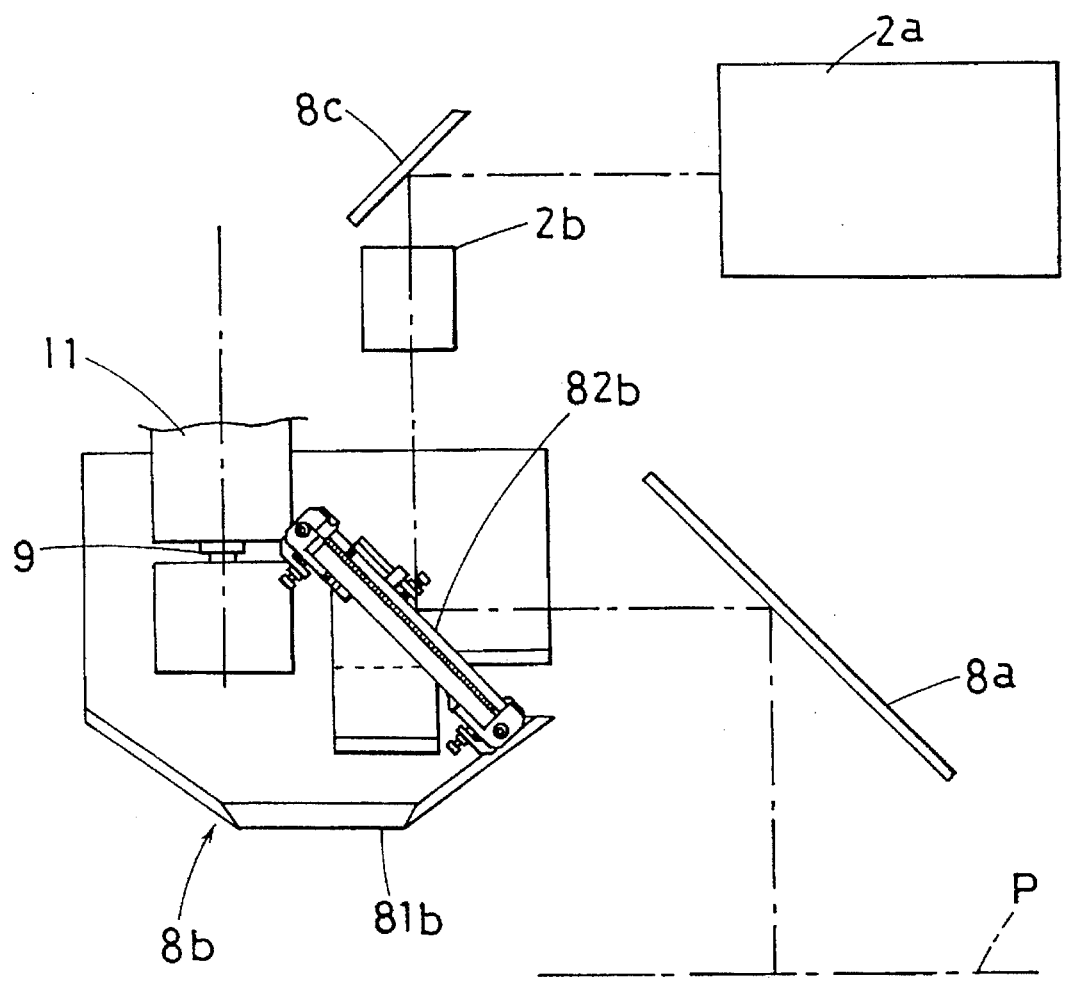

The movable mirror assembly 8b is arranged for pivotal movement about a rotary shaft 9 which is mounted to a bearing 11 of a mirror support plate 10. More specifically, the upper end of the rotary shaft 9 extends outward from the bearing 11 and has an idler pulley 12 mounted thereto. A drive belt 13 is mounted between the idler pulley 12 and a not shown drive pulley driven by an electric motor. The pivotal movement of the movable mirror assembly 8b is also controlled by (a pivot controlling means of) the controller C. As the movable mirror assembly 8b is turned, the surfaces of mirrors 81b and 82b selectively are positioned opposite to the stationary mirror 8a. The movable mirror assembly 8b is located across the light path A from the light source 1a and the light path B from the CRT 2a. An exposure lens 1c for focusing a desired negative image onto the printing paper P is disposed between the movable mirror assembly 8b and a film station 1b where the negative F is held. Similarly, another exposure lens 2b for focusing a CRT image onto the printing paper P is disposed between the CRT 2a and the movable mirror assembly 8b. A modification of the photographic exposure apparatus of Embodiment 1 is shown in FIGS. 3 and 4 where one more stationary mirror 8c is provided for reflecting a CRT image to the movable mirror assembly 8b.

In the photographic exposure apparatus of Embodiment 1, when the movable mirror assembly 8b is turned to a given angle to position first mirror 81b to face the stationary mirror 8a, the light path A of the negative image (denoted by the one-dot chain line of FIGS. 2 and 3) is reflected by the first mirror 81b and the stationary mirror 8a to the printing paper P. At such time, the second mirror 82b is dislocated from the light path to the stationary mirror 8a, thus preventing the CRT image from projecting along the light path B to the printing paper P.

When the movable mirror assembly 8b is turned 90 degrees to position second mirror 82b to face the stationary mirror 8a, the light path B of the CRT image (denoted by the two-dot chain line of FIGS. 2 and 4) is reflected by the second mirror 82b and the stationary mirror 8a to the printing paper P. At such time, the first mirror 81b is dislocated from the light path to the stationary mirror 8a, thus preventing the negative image from projecting along the light path A to the printing paper P.

The negative and CRT images are projected onto respective sheets of the printing paper P at the exposure station 7. The two different images may be printed simultaneously and overlapped with each other on a single sheet of the printing paper P by restricting the advancing movement of the printing paper P.

Also, a shutter (not shown) is provided for moving to and from the light path A between the exposure lens 1c and the movable mirror assembly 8b. The shutter when in an open mode retracts to clear the light path A for printing of the negative image and when in a closed mode, stays across the light path A for allowing the CRT image to be printed.

Embodiment 2

Figure 5:
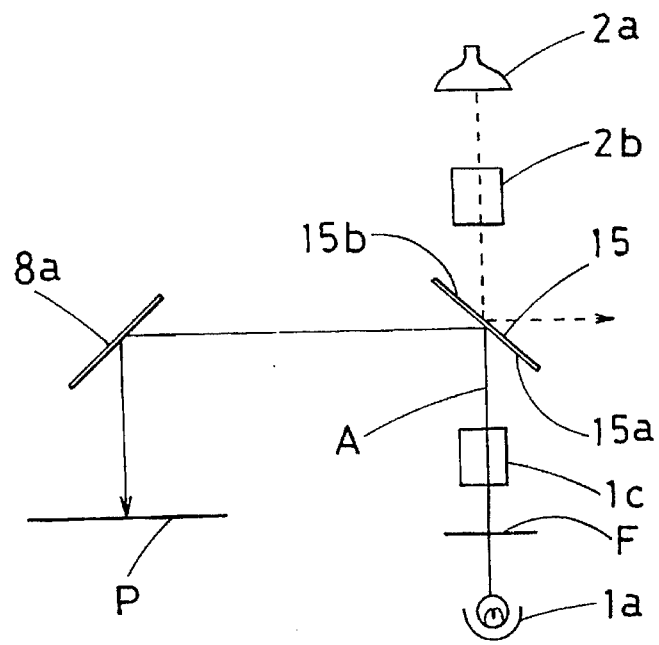
FIG. 5 is a front view of a primary part of a photographic exposure apparatus showing Embodiment 2 of the present invention.
Figure 6:
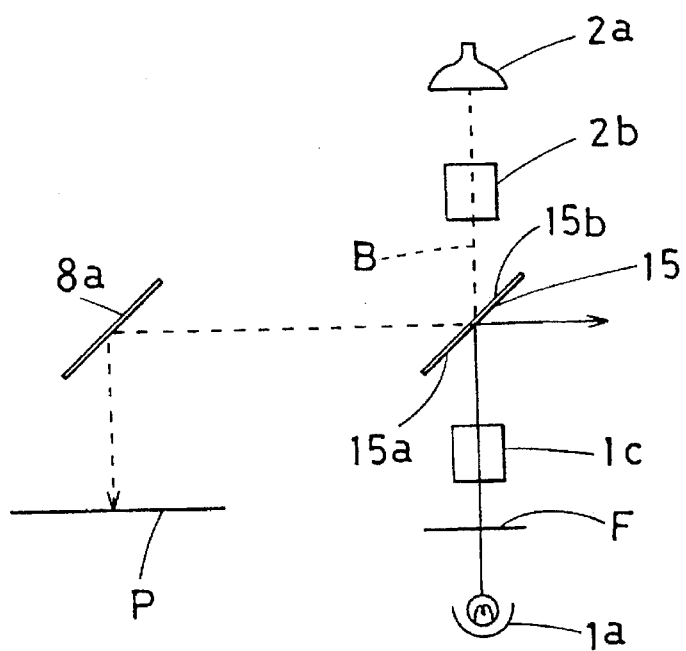
FIG. 6 is a front view showing a primary part of the same.

FIGS. 5 and 6 illustrate a photographic exposure apparatus of Embodiment 2 where a single movable mirror 15 is used for switching between the light path A for projecting a negative image and the light path B for projecting a CRT image. The movable mirror 15 has two reflective surfaces 15a and 15b arranged on opposite sides thereof. The reflective surfaces 15a and 15b are disposed at an angle of 45 degrees to the vertical line extending across the upper surface of a printing paper P in the exposure station 7. The center of pivotal movement of the movable mirror 15 coincides substantially with respective axes of exposure irradiation from CRT 2a and light source 1a. A driving means for producing the pivotal movement of the movable mirror 15 is similar to that of Embodiment 1.

When the reflective surface 15a of the movable mirror 15 is positioned opposite to a stationary mirror 8a as shown in FIG. 5, the light path A for the negative image is directed to the printing paper P be being reflected by the reflective surface 15a and the stationary mirror 8a, allowing the negative image to be printed.

When the other surface 15b of the movable mirror 15 is positioned opposite to a stationary mirror 8a due to 90-degree movement of the movable mirror 15 as shown in FIG. 6, the light path B for the CRT image is directed to the printing paper P by being reflected by the reflective surface 15b and the stationary mirror 8a, allowing the CRT image to be printed. The other components are identical to those of Embodiment 1, are denoted by the same numerals and will not be further explained.

Embodiment 3

FIGS. 7 to 14 show a photographic exposure apparatus of Embodiment 3.

Figure 7:
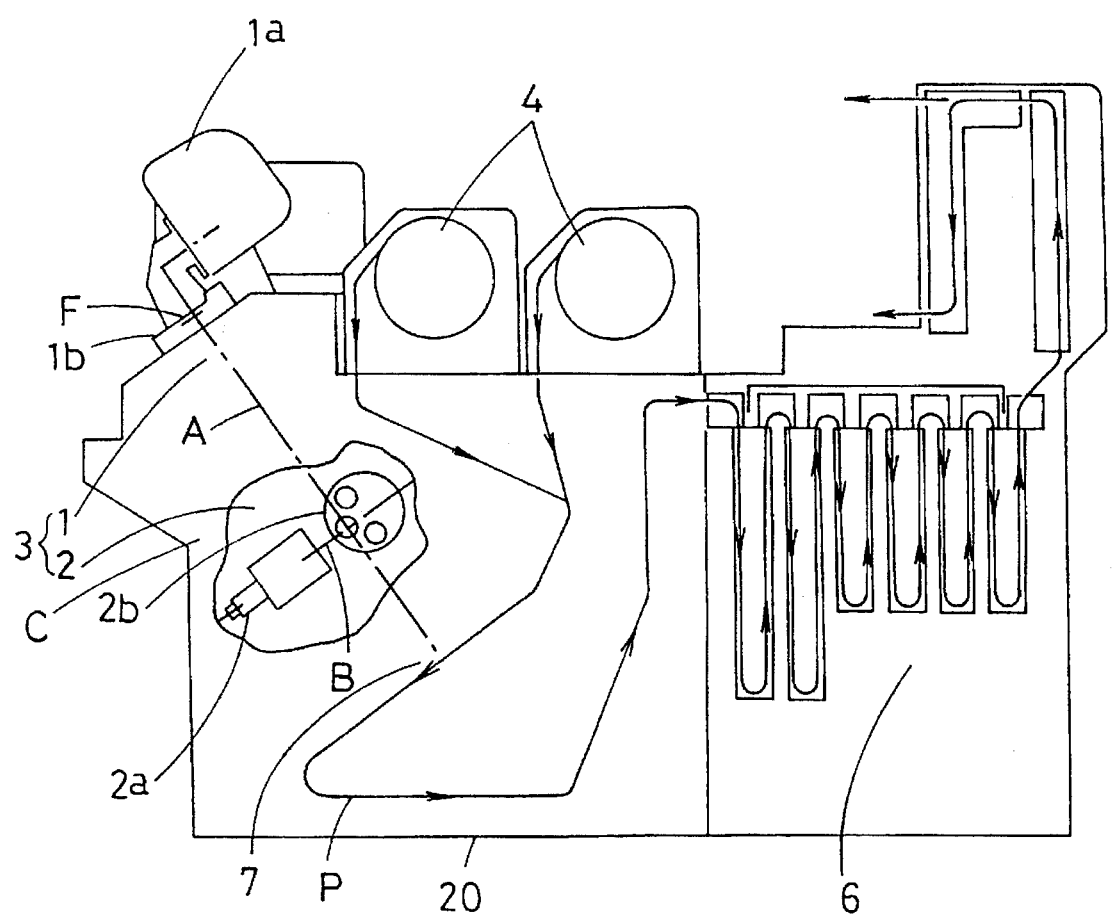
FIG. 7 is a schematic view of a photographic exposure apparatus showing Embodiment 3 of the present invention.

The photographic exposure apparatus of Embodiment 3 includes an exposure module 3 which comprises a negative image exposure means 1 and a CRT image exposure means 2. A sheet of printing paper P is unloaded from a magazine 4 and conveyed to an exposure station 7 in the exposure module 3 where it is exposed to a negative film image and a CRT image. The exposed printing paper P is then transferred to a development module 6 where it is subjected to a development process and cut into pieces of a desired size before being discharged (FIG. 7). Denoted by C is a controller for the photographic exposureapparatus. The photographic exposure apparatus includes also a negative mask module which comprises a transfer means for conveying a negative film F, a scanner for reading an image data from the negative film F, and a negative mask 1b. The negative image exposure means 1 is designed for directing an intensity of light from a light source 1a to the negative film F set in negative mask 1b and projecting a negative image of the film F onto the printing paper P at exposure station 7. The CRT image exposure means 2 is provided with a CRT display (not shown) for projecting and printing onto the printing paper P in the exposure station 7 a CRT image which is provided in the form of an index data or a text data and displayed on a CRT 2a.

The CRT image is enlarged by any of enlargement lenses 32 and 32A which can be selected by a lens switching means 30. There is provided a mirror assembly 8 for switching between light path A extending from the negative image exposure means 1 and light path B extending from the CRT image exposure means 2. The mirror device 8 is arranged to be movable to and from the light path A and such movement is controlled by a light path switching means 40.

Figure 8:
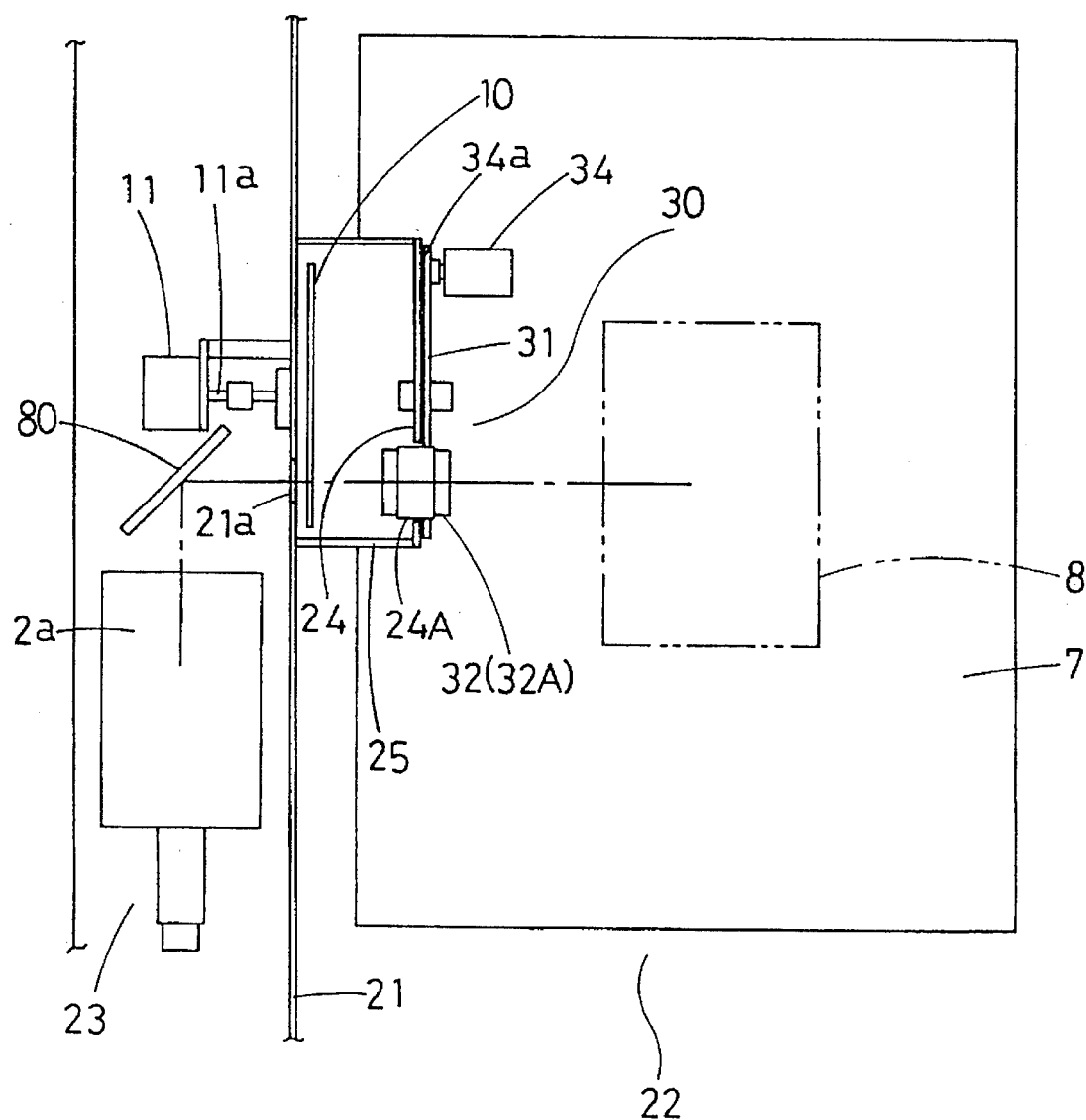
FIG. 8 is a cross sectional view showing a primary part of the same.
Figure 10:
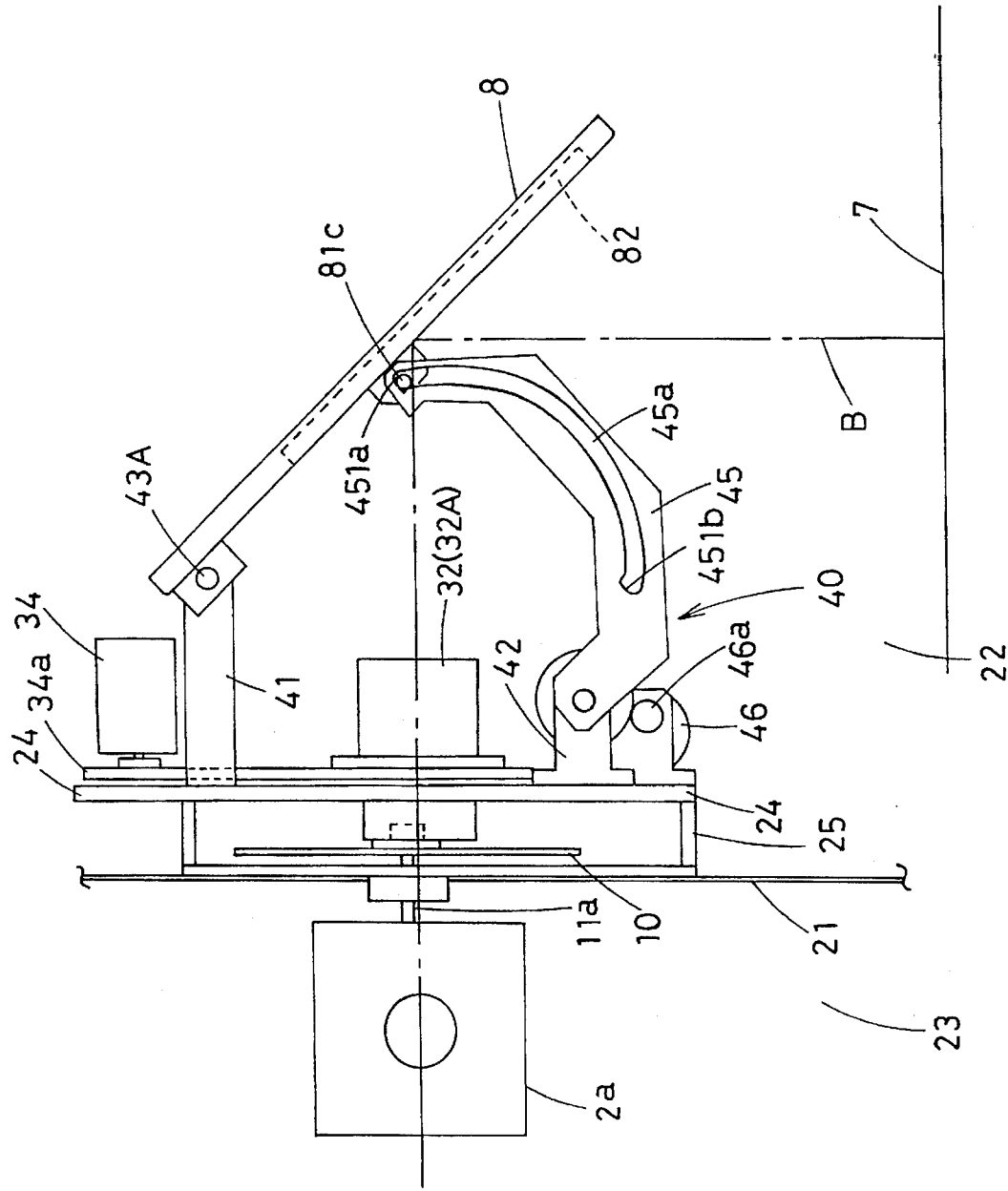
FIG. 10 is a cross sectional view of the same.

The mirror assembly 8 comprises a mirror holder 81, and a light reflective mirror 82 seated in a recess 81a of the mirror holder 81. The mirror holder 81 has a pair of mounting lugs 81b mounted to opposite sides of the rear surface thereof. Two guide pins 81c extend outwardly from opposite sides of a Center region thereof. A dark room 22 is defined by a partition wall 21 in a casing 20 of the photographic exposure apparatus. A mounting platform 24 is mounted at the inside (the dark room 22 side) of the partition wall 21 while a CRT mounting space 23 is provided outside thereof (FIGS. 8 and 10). The lens switching means 30 and the light path switching means 40 are mounted on the mounting platform 24. The mounting platform 24 is fixedly mounted by a retaining frame 25 to the partition wall 21. The retaining frame 25 is provided for protecting a filter wheel 10 from dust and light.

The construction of the light path switching means 40 will now be explained. A pair of first supports 41 and a pair of second supports 42 are mounted on the mounting platform 24. The two first supports 41 hold a first pivot shaft 43 movable therebetween. Joined to both ends of the first pivot shaft 43 are the mounting lugs 81b of the mirror holder 81. This arrangement forms a pivotal center 43A about which the mirror assembly 8 turns to change the angle of reflective mirror 82. A second pivot shaft 44 is movably mounted between the two second supports 42. The second pivot shaft 44 is joined at both ends to proximal ends of two C-shaped mirror arms 45. Each mirror arm 45 has a guide slot 45a provided lengthwisely therein for accepting one of the guide pins 81c of the mirror holder 81. One of the mirror arms 45 has a detection plate 45b mounted to the proximal end thereof.

Also, a mirror driving motor 46 is mounted on the mounting platform 24. The drive shaft of the mirror driving motor 46 has a friction wheel 46a mounted to one end thereof. The friction wheel 46a remains in direct contact with a friction wheel 48a of a friction assembly 48 mounted to the second pivot shaft 44. The friction assembly 48 is designed for eliminating an overrun movement of the mirror arms 45 which would occur during a time lag from the detection of the position of the mirror assembly 8 by detecting the detection plate 45b by sensors S1 and S2 to the stopping of the movement of the mirror driving motor 46, as will be described below in more detail. The two sensors S1 and S2 are of a transmission type (emitting and receiving light at once) and are mounted to one of the second supports 42. The sensor S1 detects the detection plate 45b on the mirror arm 45 when the mirror assembly 8 is moved to its uppermost position thereof away from platform 24 by the action of the mirror arms 45 and stops the movement of the mirror driving motor 46. The sensor S2 detects the detection plate 45b on the mirror arm 45 when the mirror assembly 8 is moved to a lowermost position thereof close to the platform 24 by the action of the mirror arms 45 and stops the movement of the mirror driving motor 46.

Figure 12:
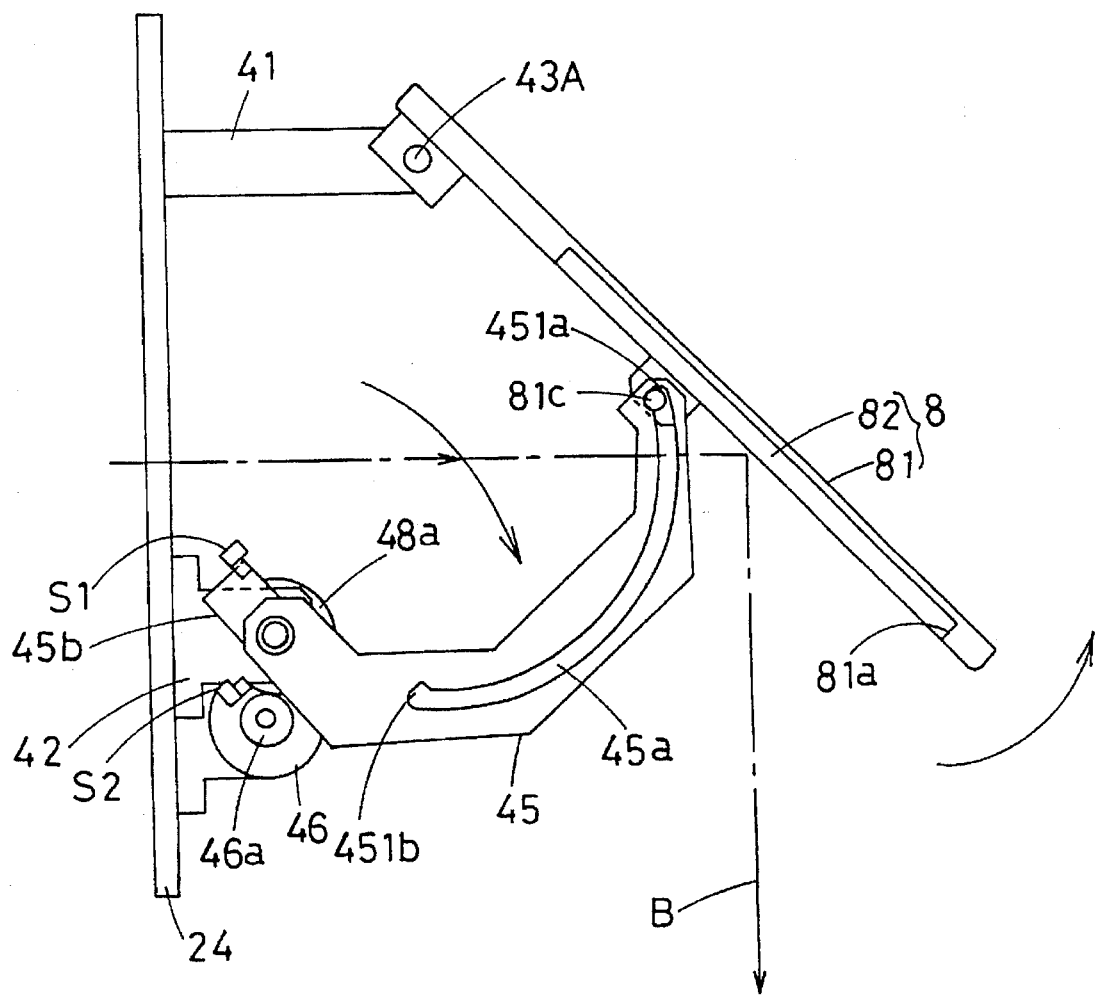
FIGS. 12 and 13 are front views explaining an operation in the same.

More specifically, as the mirror arms 45 are turned in a direction denoted by the clockwise arrow in FIG. 12, the mirror assembly 8 pivots around center 43A in the direction of the counterclockwise arrow in FIG. 12 and moves away from the mounting platform 24. Upon the guide pins 81c of the mirror holder 81 reaching and engaging distal ends 451a of the guide slots 45a of the mirror arms 45, the sensor S1 detects the detection plate 45b and stops the mirror driving motor 46. In such position, the mirror assembly 8 is at its uppermost position with reflective mirror 82 extending across the light path B for projecting the CRT image. Accordingly, the light path B is cleared while the light path A for projecting the negative image is interrupted.

Figure 13:
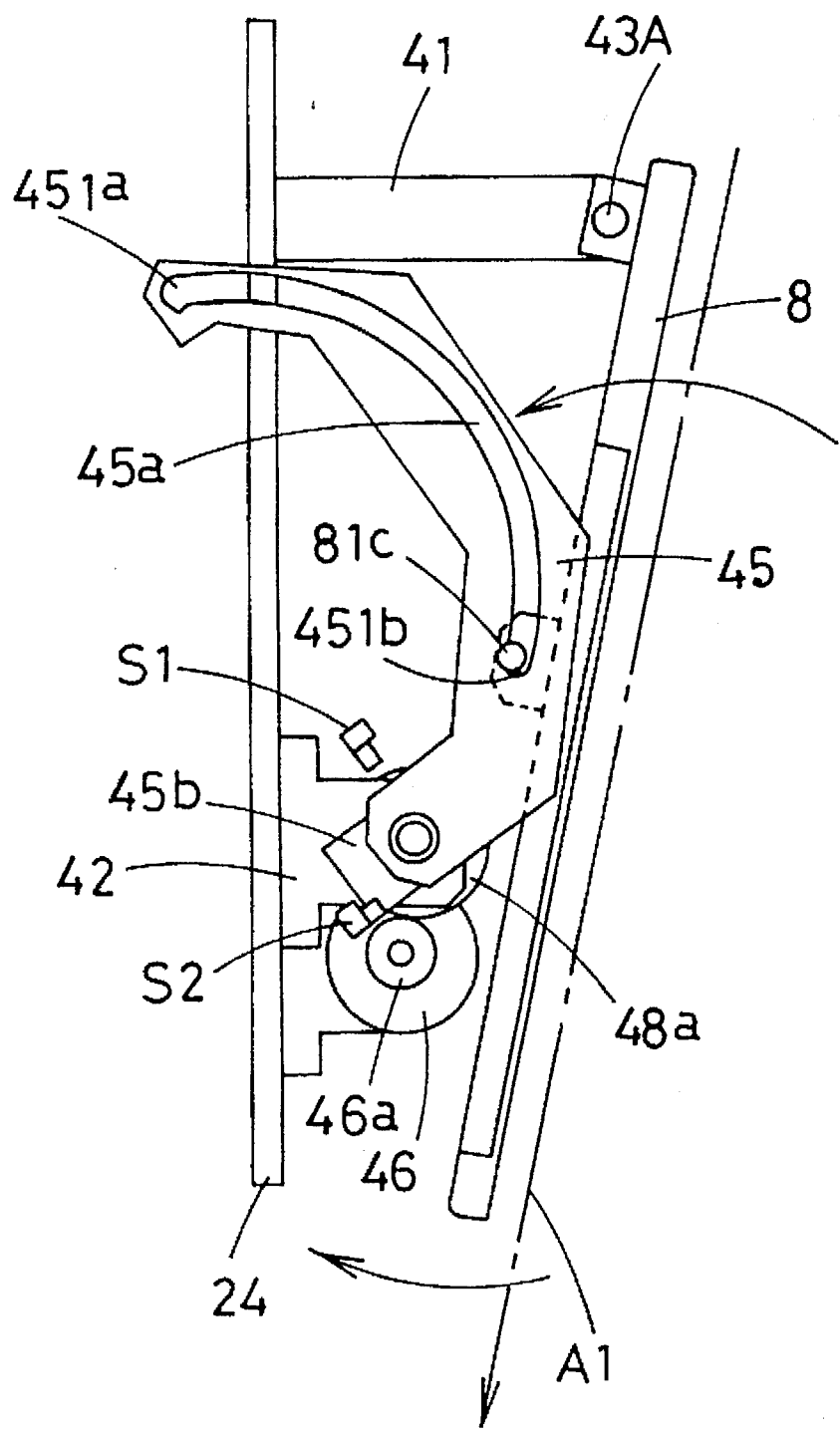

When the mirror arms 45 are turned in a reverse direction denoted by the counterclockwise arrow in FIG. 13, the mirror assembly 8 pivots about center 43A in the direction indicated by the clockwise arrow in FIG. 13 and moves toward mounting platform 24. Upon the guide pins 81c of the mirror holder 81 reaching and engaging the other ends 451b of the guide slots 45a of the mirror arms 45, the sensor S2 detects the detection plate 45b and stops the mirror driving motor 46. In such position, the mirror assembly 8 is at its lowermost position with reflective mirror 82 spaced away from an outer edge A1 of the light path A for projecting the negative image. Accordingly, the light path A is cleared while the light path B for projecting the CRT image is interrupted.

Figure 9:
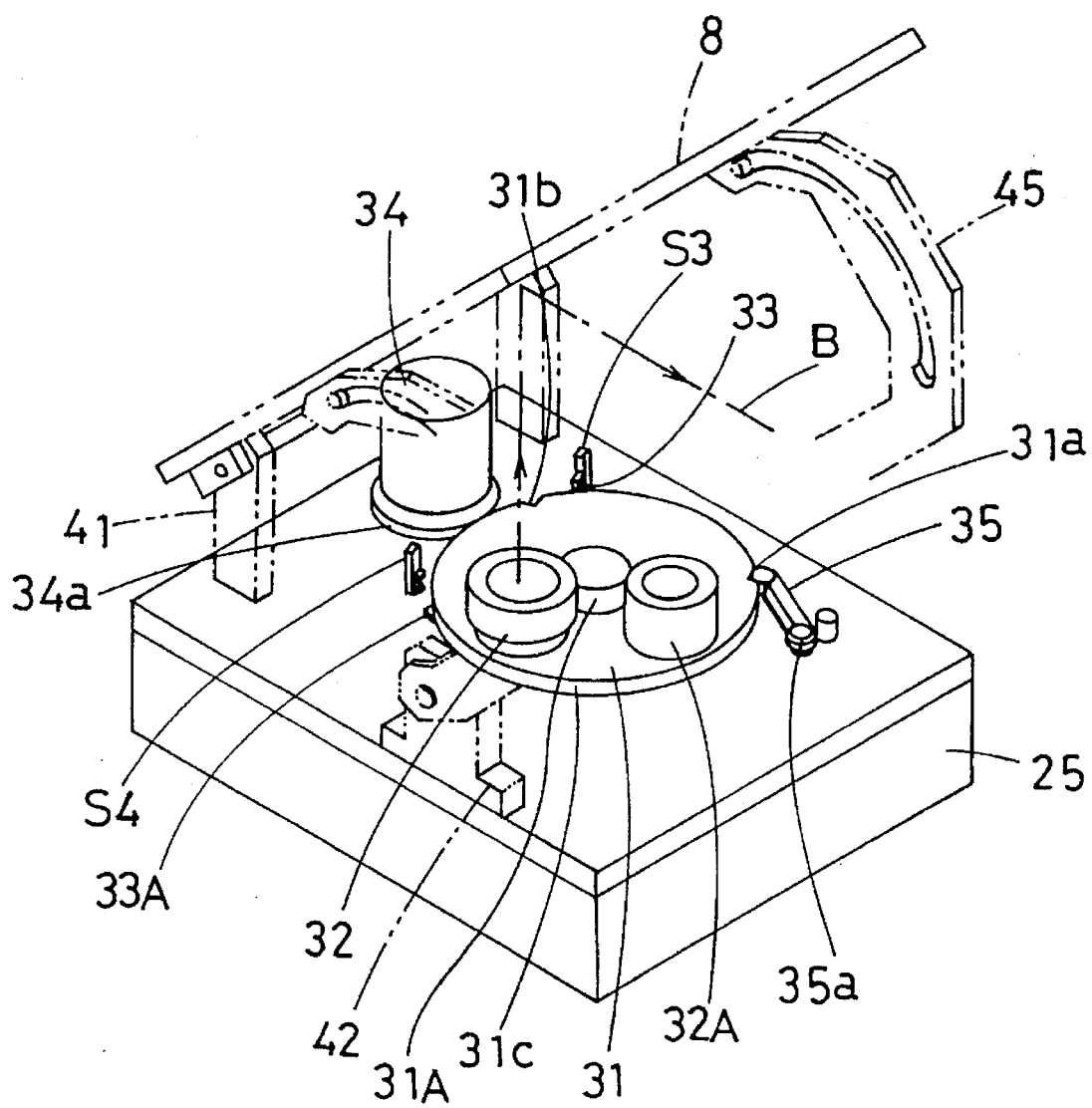
FIG. 9 is a perspective view of the same.
Figure 11:
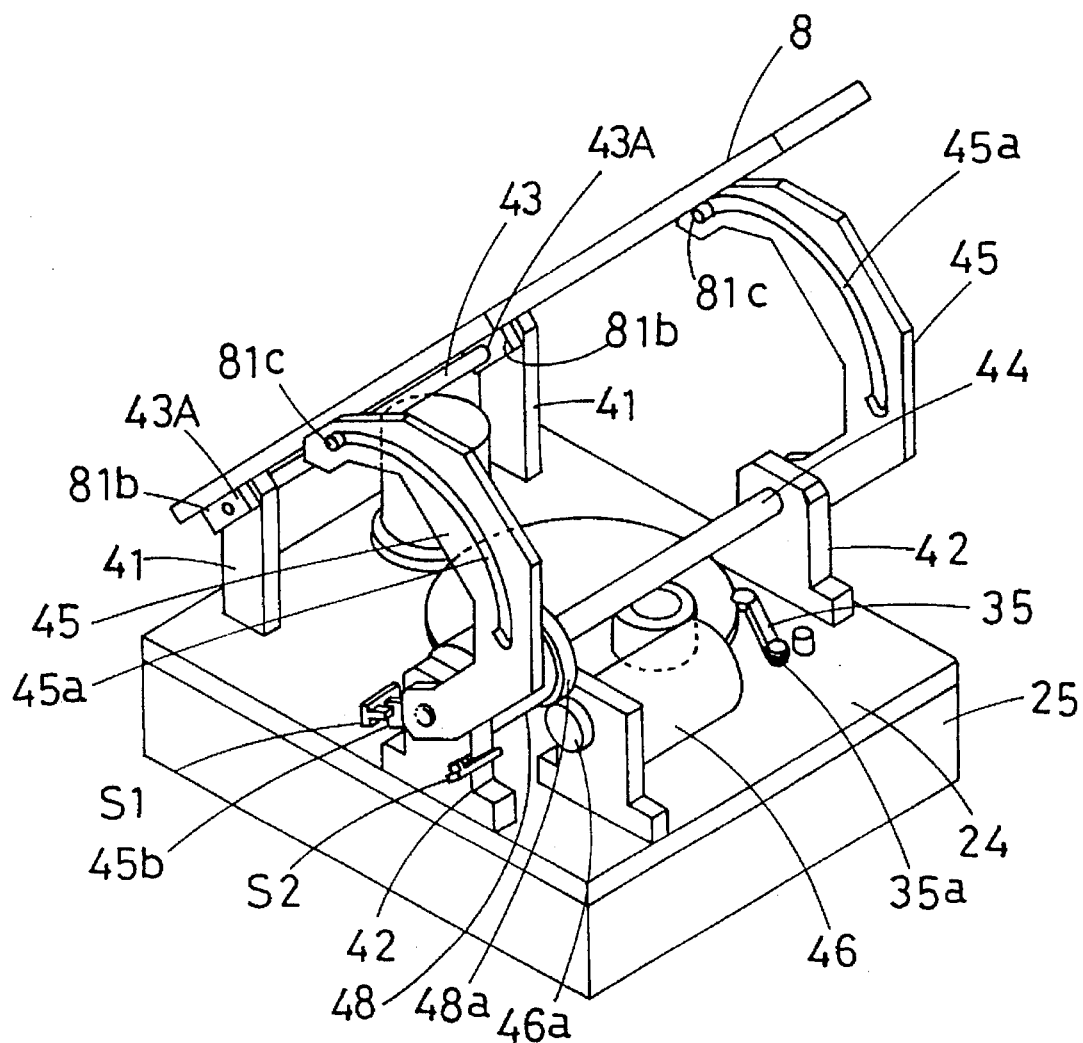
FIG. 11 is a perspective view of the same.

The enlargement lenses 32 and 32A of the lens switching means 38 for enlarging the CRT image to different sizes are mounted on a turret table 31 (lens holder). Any of the enlargement lenses 32 and 32A may be selectively disposed across the light path B by turning the turret table 31 by a corresponding angle. The turret table 31 is rotatably mounted by a shaft 31A to the mounting platform 24. More particularly, the turret table 31 has a friction surface 31c arranged on the circumferential edge thereof with two notches 31a and 31b spaced from each other circumferentially by a given distance. Two detection tabs 33 and 33A are mounted outwardly of the outer edge of the turret table 31 at positions to not interrupt the friction surface 31c. Also installed on the mounting platform 24 is a lens switching motor 34 which has a friction wheel 34a mounted to the drive shaft thereof. The friction wheel 34a is directly engaged with the friction surface 31c of the turret table 31. The turret table 31 is locked at predetermined positions by a ratchet 35. The ratchet 35 is pivotably mounted on the mounting platform 24 outwardly of the turret table 31 and is urged toward the turret table 31 by a spring 35a so that it can fall into the notches 31a and 31b (FIGS. 9 and 11). Two sensors S3 and S4 of a transmission type (emitting and receiving light at a time) are also mounted on the mounting platform 24 outwardly of the turret table 31.

Upon the lens enlargement lens 32 arriving at the light path B for projecting the CRT image by table 31 having been driven by the lens switching motor 34, the sensor S3 detects detection tab 33 on the turret table 31 and then stops the lens switching motor 34. Similarly when the lens enlargement lens 32A arrives at the light path B by table 31 having been driven by the lens switching motor 34, the sensor S4 detects detection tab 33A on the turret table 31 and then stops the lens switching motor 34. More particularly, the turret table 31 is rotated when enlargement lens 32 is to be employed for projecting and printing a CRT image on the printing paper P. Upon the sensor S3 detecting the detection tab 33, the lens switching motor 34 is deenergized, thus positioning the enlargement lens 32 to be across the light path B for projecting the CRT image. Simultaneously, the ratchet 35 moves into the notch 31a of the turret table 31 and prevents an overrun of the turret table 31. When enlargement lens 32A is to be employed for projecting and printing a CRT image on the printing paper P, the turret table 31 is further turned. Upon the sensor S4 detecting the detection tab 33A, the lens switching motor 34 is deenergized, thus positioning the enlargement lens 32A to be across the light path B for projecting the CRT image. At the time, the ratchet 35 moves into the other notch 31b of the turret table 31 and prevents an overrun of the turret table 31. Also, a stationary mirror 80 is provided for directing the CRT image to the enlargement lens 32 or 32A (FIG. 8).

The filter wheel 10 comprises three, i.e. blue, green, and red (BGR), color filters. As the filter wheel 10 is turned, one of its BGR color filters extends across the light path B, thus to pass and print a selected color of the CRT image on the printing paper P. The filter wheel 10 is disposed between the partition wall 21 and the mounting platform 24 and is driven by drive shaft 11a of driving motor 11 mounted to the outer surface of the partition wall 21.

The partition wall 21 has therein an opening 21a for passage of the CRT image light path B. The opening 21a is located opposite to the filter wheel 10. Also, the mounting platform 24 has therein a slot 24A within which the enlargement lenses 32 and 32A are positioned and move during switching (FIG. 8).

Figure 14:
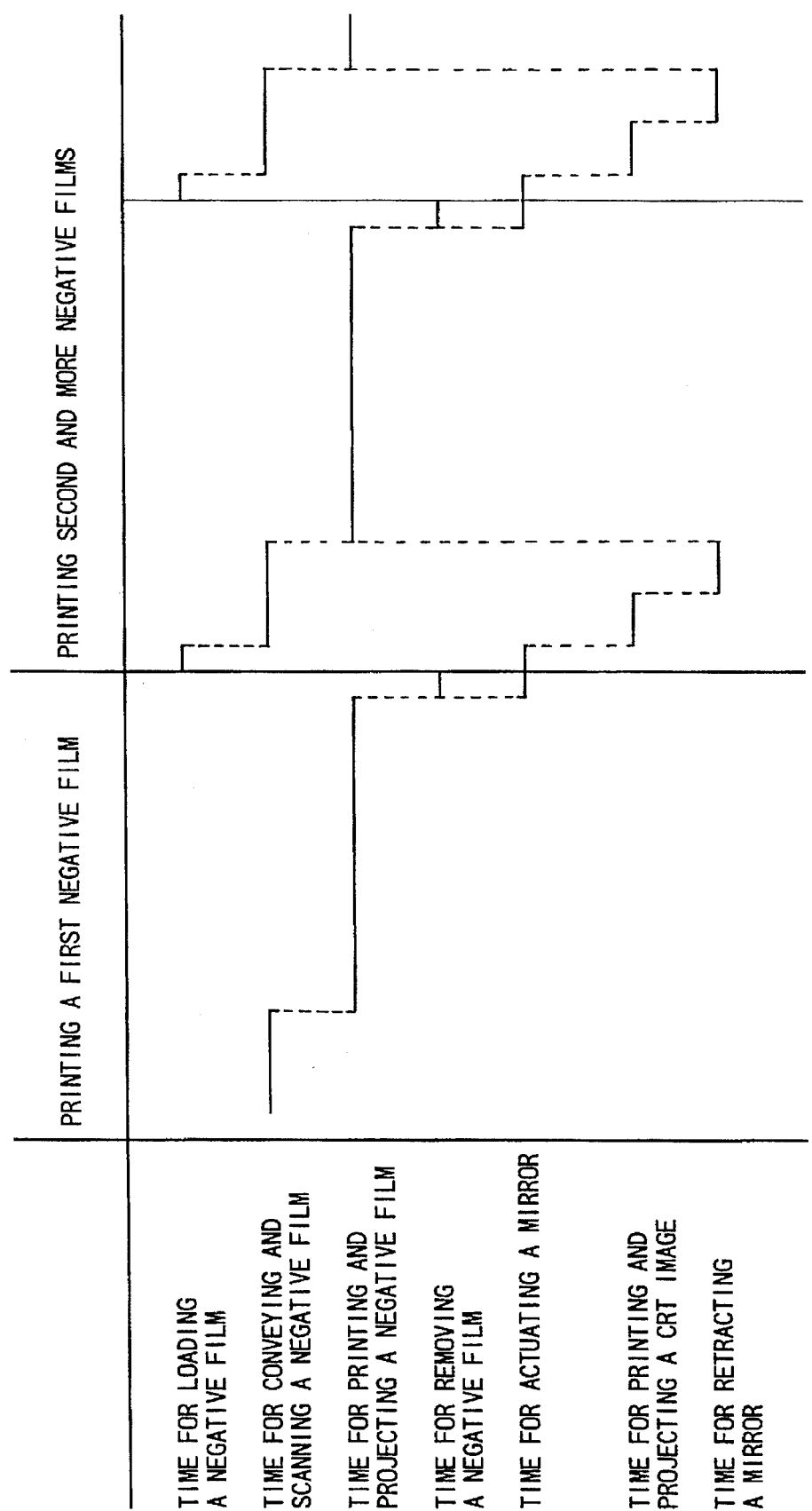
FIG. 14 is a timing chart showing steps of printing a negative film image and a CRT image.
Figure 15:
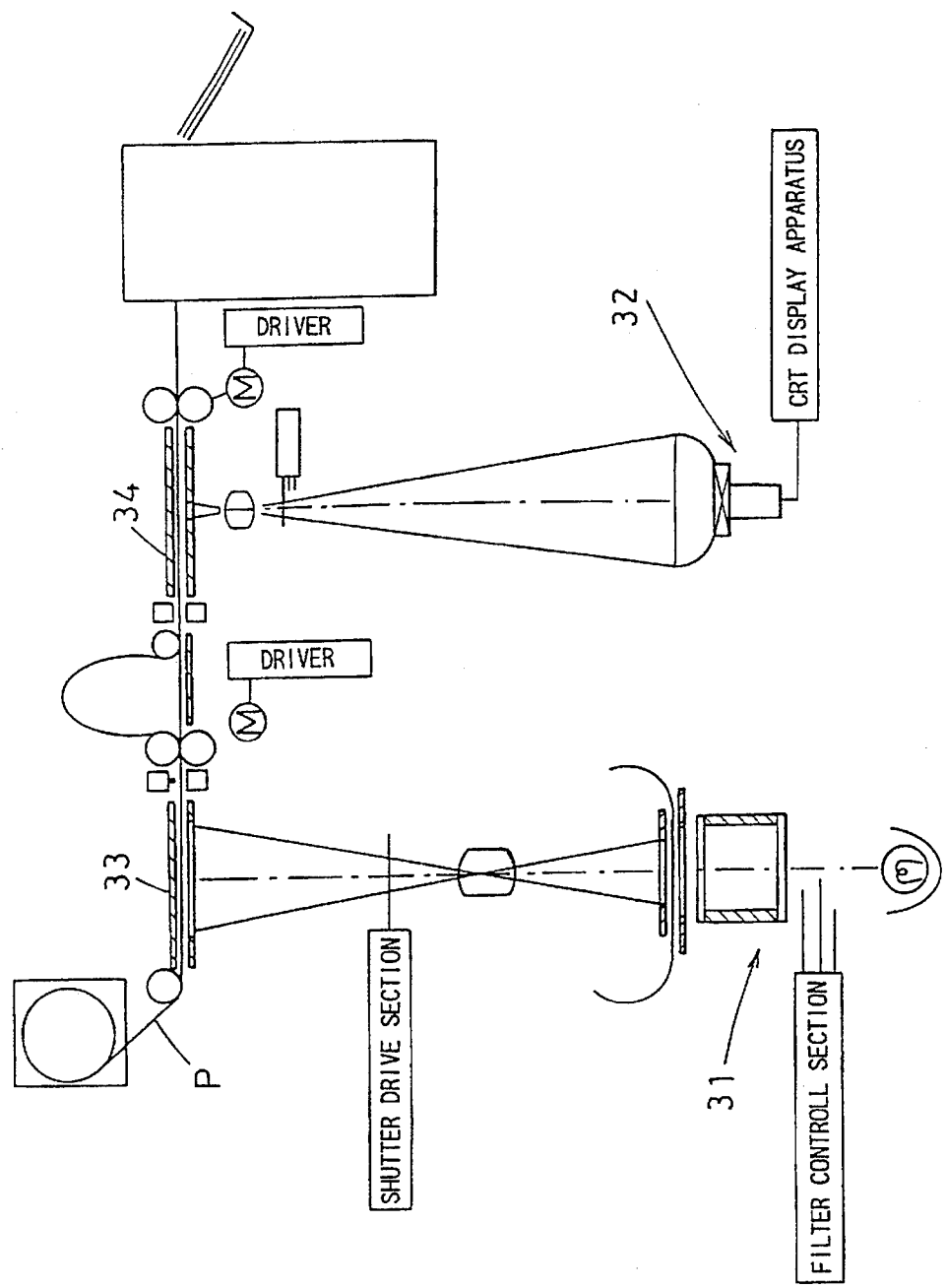
FIG. 15 is a schematic view of a conventional photographic exposure apparatus showing Prior Art 1.
Figure 16:
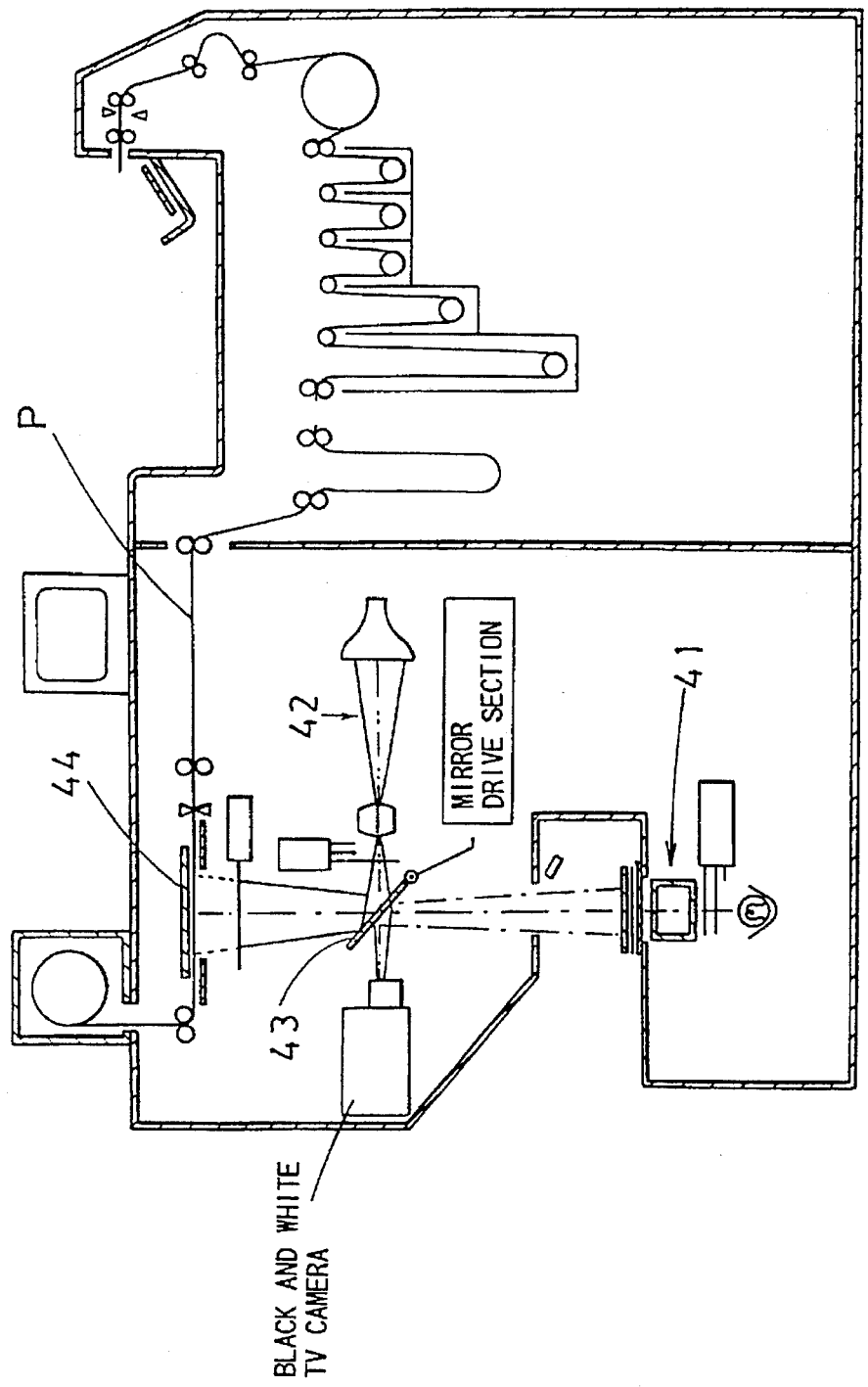
FIG. 16 is a schematic view of another conventional photographic exposure apparatus showing Prior Art 2.

FIG. 14 is a timing chart showing the operation of printing the negative image from the negative film F and the CRT image from the CRT 2a.

A first one of the negative films F held by the film holder is conveyed, scanned, and loaded to the negative mask 1b in the mask module where a desired frame image on the negative film F is projected and printed on the printing paper P at exposure station 7. Then, the negative film F is moved from the negative mask 1b. During the removal of the first negative film F and the loading of a second negative film F after the process of initial printing is completed, the mirror assembly 8 is actuated to allow passage of the light path B for projecting the CRT image and simultaneously to interrupt the negative image light path A. Also, while the second negative film F is conveyed and scanned, the process of index printing is carried out with the CRT 2a projecting index data of the frames on the first negative film F. Then, the mirror assembly 8 is retracted to disable the light path B and clear the light path A. By repeating the above actions, third and more negative films F are processed.

In the photographic exposure apparatus of the present invention, the index data from a negative film F can be printed with the CRT 2a in response to each request during a part of the cycle period for the entire printing procedure.

It is understood that the image display means in the photographic exposure apparatus is not limited to the CRT of the illustrated embodiments, but may be a TFT LED display, a electroluminescent (EL) display, or the like.

What is claimed is:

1. A photographic exposure apparatus comprising:
   an exposure station to support a photosensitive material;
   an image display device for directing an optical pattern of a display image along a first path to the photosensitive material at said exposure station;
   a negative image exposure device for directing an optical pattern of a negative image from a negative film along a second path to the photosensitive material at said exposure station;
   a mirror assembly always positioned in said first and second paths, said mirror assembly including first and second mirrors; and
   mirror driving means for selectively turning said mirror assembly between a first position, whereat said optical pattern of said display image is passed along said first path to the photosensitive material at said exposure station and said second path is interrupted such that said optical pattern of said negative image is not passed to the photosensitive material at said exposure station, and a second position, whereat said optical pattern of said negative image is passed along said second path to the photosensitive material at said exposure station and said first path is interrupted such that said optical pattern of said display image is not passed to the photosensitive material at said exposure station.

2. An apparatus as claimed in claim 1, wherein said mirror assembly is mounted for pivotal movement about a rotation axis, and said mirror driving means pivots said mirror assembly about said axis between said first and second positions.

3. An apparatus as claimed in claim 1, wherein when said mirror assembly is in said first position said first mirror deflects said first path to the photosensitive material at said exposure station, and when said mirror assembly is in said second position said second mirror deflects said second path to the photosensitive material at said exposure station.

4. A photographic exposure apparatus comprising:
   an exposure station to support a photosensitive material;
   an image display device for directing an optical pattern of a display image along a first path to the photosensitive material at said exposure station;
   a negative image exposure device for directing an optical pattern of a negative image from a negative film along a second path to the photosensitive material at said exposure station;

a mirror arm pivotally mounted at an end thereof, said mirror arm having a guide slot extending lengthwise thereof;

a mirror pivotally mounted and having a guide pin fitting in said guide slot; and means for imparting pivoting movement to said mirror to selectively move said mirror between a first position, whereat said mirror passes one of said first and second paths to the photosensitive material at said exposure station and blocks the other of said first and second paths from passing to the photosensitive material at said exposure station, and a second position, whereat said mirror blocks said one of said first and second paths from passing to the photosensitive material at said exposure station and is moved out of said other of said first and second paths such that said other of said first and second paths is passed to the photosensitive material at said exposure station.

5. An apparatus as claimed in claim 4, wherein said mirror is pivotally mounted at an end thereof.

6. An apparatus as claimed in claim 4, wherein said guide pin is located at a central portion of said mirror.

7. An apparatus as claimed in claim 4, wherein said mirror arm is pivoted about a first axis, said mirror is pivoted about a second axis, and said imparting means comprises means for pivoting said mirror arm about said first axis, thereby causing sliding movement of said mirror arm guide slot relative to said guide pin and pivoting of said mirror about said second axis.

8. An apparatus as claimed in claim 7, wherein said pivoting of said mirror about said second axis is in a direction opposite to pivoting of said mirror arm about said first axis.

9. A photographic exposure apparatus comprising:

an exposure station to support a photosensitive material;

an image display device for directing an optical pattern of a display image along a first path to the photosensitive material at said exposure station;

a negative image exposure device for directing an optical pattern of a negative image from a negative film along a second path to the photosensitive material at said exposure station;

a switching station-having thereat a movable mirror and a light path switching means operable to selectively move said mirror between first and second positions respectively enabling passage to the photosensitive material at said exposure station of said first and second paths;

a lens holder located at said switching station, said lens holder being movable and supporting plural lenses; and lens switching means at said switching station for selectively moving said lens holder to bring a selected one of said lenses across said first path.

10. An apparatus as claimed in claim 9, further comprising a partition wall separating said switching station from a mounting space having therein said image display device.

11. An apparatus as claimed in claim 9, wherein said switching station includes a mounting platform, and said mirror, said light path switching means, said lens holder and said lens switching means are mounted on said mounting platform.

12. A photographic exposure apparatus comprising:

an exposure station to support a photosensitive material;

an image display device for directing an optical pattern of a display image along a first path to the photosensitive material at said exposure station;

a negative image exposure device for directing an optical pattern of a negative image from a negative film along a second path to the photosensitive material at said exposure station;

switching means for selectively switching between a first exposure mode, whereat said first path is allowed to pass to the photosensitive material at said exposure station while said second path is not allowed to pass to the photosensitive material at said exposure station, and a second exposure mode, whereat said second path is allowed to pass to the photosensitive material at said exposure station and said first path is not allowed to pass to the photosensitive material at said exposure station; and control means for controlling operation of said switching means such that said first exposure mode is enabled during a period from the end of printing of one negative image directed from said negative image exposure device to the start of printing of a next negative image directed from said negative image exposure device.

* * * * *